Feb. 26, 1935.  W. G. BARTENFELD  1,992,597
MEANS FOR CONNECTING STRUCTURAL MEMBERS
Filed March 6, 1931
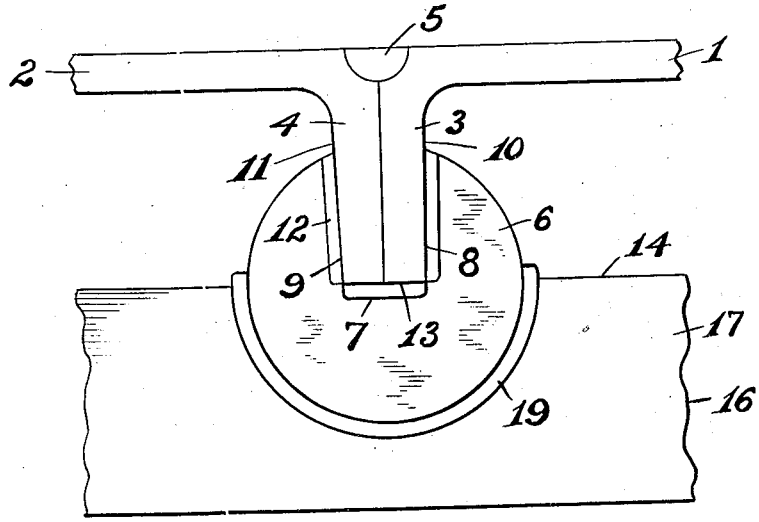
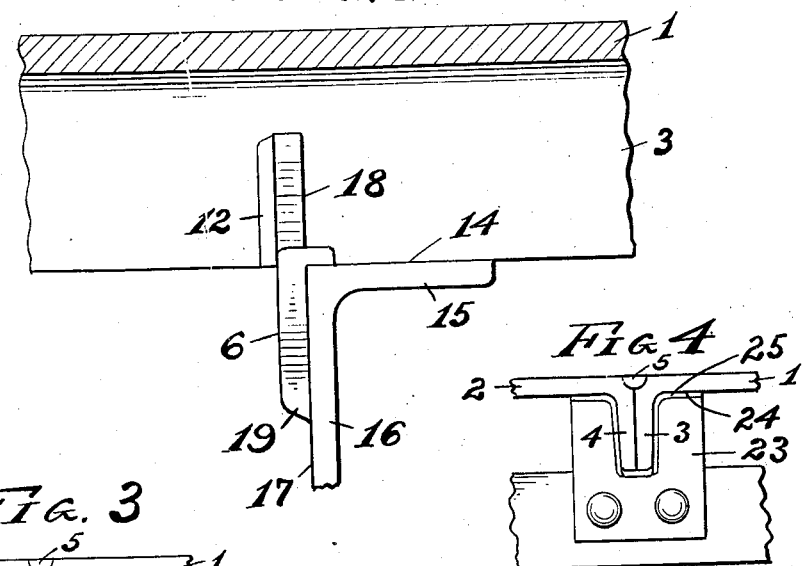
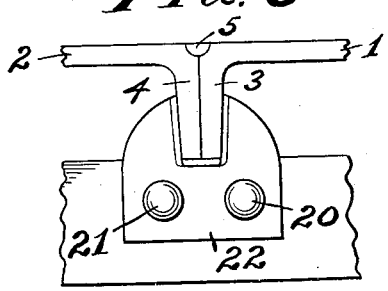
Inventor
W. G. Bartenfeld
By G. E. Dunstan,
his Attorney Patented Feb. 26, 1935

1,992,597

UNITED STATES PATENT OFFICE 1,992,597

MEANS FOR CONNECTING STRUCTURAL MEMBERS

Wilford G. Bartenfeld, Lorain, Ohio

Application March 6, 1931, Serial No. 520,688

2 Claims. (Cl. 189—36)

This invention relates to means for connecting structural members especially channels, and has for its main object to provide a clip for drawing and connecting together the flanges of adjacent channels or other flanged structural members employed in the construction of vessels, cars, buildings and other structures.

Another object of the invention is to provide a clip for connecting structural members which may be conveniently connected to a support.

A further object of the invention is to provide a clip for connecting structural members, which is of simple and practical construction, easy to apply and will draw and hold the channels together to permit the joint thereof to be welded.

With the above and other objects in view, the invention will be hereinafter fully described as illustrated in the accompanying drawing, and the novel features thereof will be distinctly pointed out in the appended claims.

In the drawing, similar characters of reference indicate corresponding parts.

Figure 1 is an end view illustrating a pair of channels with their adjacent flanges connected together by a clip and the clip fixed to a support in accordance with my invention, Fig. 2 is a view looking at the right-hand end of Fig. 1, Fig. 3 is a similar view to Fig. 1 illustrating a clip riveted instead of welded to the support, and Fig. 4 is a similar view illustrating a modification.

Referring to the drawing, 1 and 2 represent standard steel channels arranged with their flanges 3 and 4 adjacent each other. In order to fix together said flanges by first drawing them tightly together prior to welding of the joint at 5 to make a strong connection and also a water or oil tight seam, a clip 6 is employed. Said clip is constructed from plate steel, is preferably circular, and provided with a recess 7 extending from one edge thereof and having inwardly tapering sides 8 and 9 corresponding to the taper of the outer sides 10 and 11 of the flanges of the channels 1 and 2. The width of the recess 7 is slightly correspondingly less than the thickness of the pair of flanges of the channels to be fixed together so that when the clip 6 is driven over said flanges, the channels will be drawn tightly together and held in position. The clip 6 is welded to the flanges 3 and 4 as indicated at 12.

The clip 6 is readily connected to a support as will now be described. The outer edges or ends 13 of the flanges 3 and 4 of the channels rest upon the upper side 14 of the flange 15 of a channel 16 extending at a right angle to the channels 1 and 2, and its outer side 17 abuts against the inner side 18 of the clip 6. Said clip is welded to the channel 16 as shown at 19, and the weld extends over the upper side 14 thereof. The clip 6 used as described draws and clamps pairs of channels together and is convenient for connecting to a support, thereby providing a simple and practical means for connecting pairs of channels together and also connecting said channels to a support.

Instead of driving the clip 6 over the flanges of the channels as described, sometimes every other clip or even more frequently, the clip may be loosely slipped over the flanges of the channels and the clip welded thereto and to the support.

If desired the clip may be riveted to the support, and in order to provide for two rivets 20 and 21 for giving sufficient strength, the clip is made rectangular at its lower end as shown at 22.

In Fig. 4 is shown a rectangular clip 23, which may be used as already described, except that its upper straight edge 24 may be welded, as at 25, to the under side of the channels 1 and 2.

From the above, it will be seen that clips constructed and used as described, afford a simple, convenient and practical means for drawing and connecting channels or other flanged structural members together and for connecting same to a support. It will be understood that although this clip is illustrated and described in a certain construction, that it may be used for many purposes where two flanged members are to be connected together and said members connected to a support.

Having fully described my invention, what I claim is:

1. A means for connecting the flanges of channel members comprising a plate, the plate having a recess, the recess extending from one edge of said plate, the recess having inwardly inclined sides adapted to engage the inner sides of the flanges of said channel members, the width of said recess being correspondingly less than the thickness of the flanges of the channel members to be connected, the sides of said recess of said plate being fixed to said channel members, a support, the flanges of the channel members resting upon said support, and said plate being fixed to said support.

2. A means for connecting the flanges of channel members comprising a plate, the plate having a vertical recess, the recess extending from the upper edge of said plate, the recess having inwardly inclined sides from the upper edge of said plate adapted to engage the inner sides of the flanges of said channel members, the width of said recess being correspondingly less than the thickness of the flanges of the channel members to be connected, the upper edge of said plate being adjacent said channel members, the sides of said recess and the upper edge of said plate being fixed to said channel members, a support, the flanges of said channel members resting upon said support, and said plate being fixed to said support.

WILFORD G. BARTENFELD.